United States Patent

[11] 3,542,412

| [72] | Inventors | Heinrich Koch<br>Bad Sulzuflen;<br>Kurt Hermsmeyer, Obernbeck, Germany |
|---|---|---|
| [21] | Appl. No. | 728,199 |
| [22] | Filed | May 10, 1968 |
| [45] | Patented | Nov. 24, 1970 |
| [73] | Assignee | Paul R. Kull Sr. and Henry Y. Kuhl<br>by mesne assignments |
| [32] | Priority | May 12, 1967 |
| [33] | | Germany |
| [31] | | No. P1,506,964.4 |

[54] SUCTION LIFTER ENABLING THE SIMULTANEOUS LIFTING OF A PLURALITY OF ITEMS
8 Claims, 4 Drawing Figs.

[52] U.S. Cl. .................................................. 294/65;
198/34; 214/1; 248/206; 294/64
[51] Int. Cl. ............................................... B65g 47/26
[50] Field of Search .......................................... 294/65, 64,
64(AB), 87A; 198/34; 248/363, 206; 206/65;
214/1B.S.1, 1B.S.2, 1B.S.3, 1B.S.4

[56] References Cited
UNITED STATES PATENTS

| 2,903,290 | 9/1959 | Morris et al. ................ | 294/65 |
| 3,062,578 | 11/1962 | Bushong ...................... | 294/65 |
| 3,077,993 | 2/1963 | Mulvany et al. ............. | 294/64 |
| 3,230,001 | 1/1966 | Hirt ............................. | 294/64 |

*Primary Examiner*—Richard E. Aegerter
*Assistant Examiner*—Roger S. Gaither
*Attorney*—Spencer & Kaye ABSTRACT: A suction lifter enables the simultaneous lifting of a plurality of items, such as eggs, arranged in rows. The lifter has suction heads arranged along the underside of a plurality of parallel tubes which are themselves mutually displaceable perpendicular to their length. This enables their position to be adjusted so as to allow items picked up from continuous rows on a conveyor to be replaced in a different, and variable, configuration.

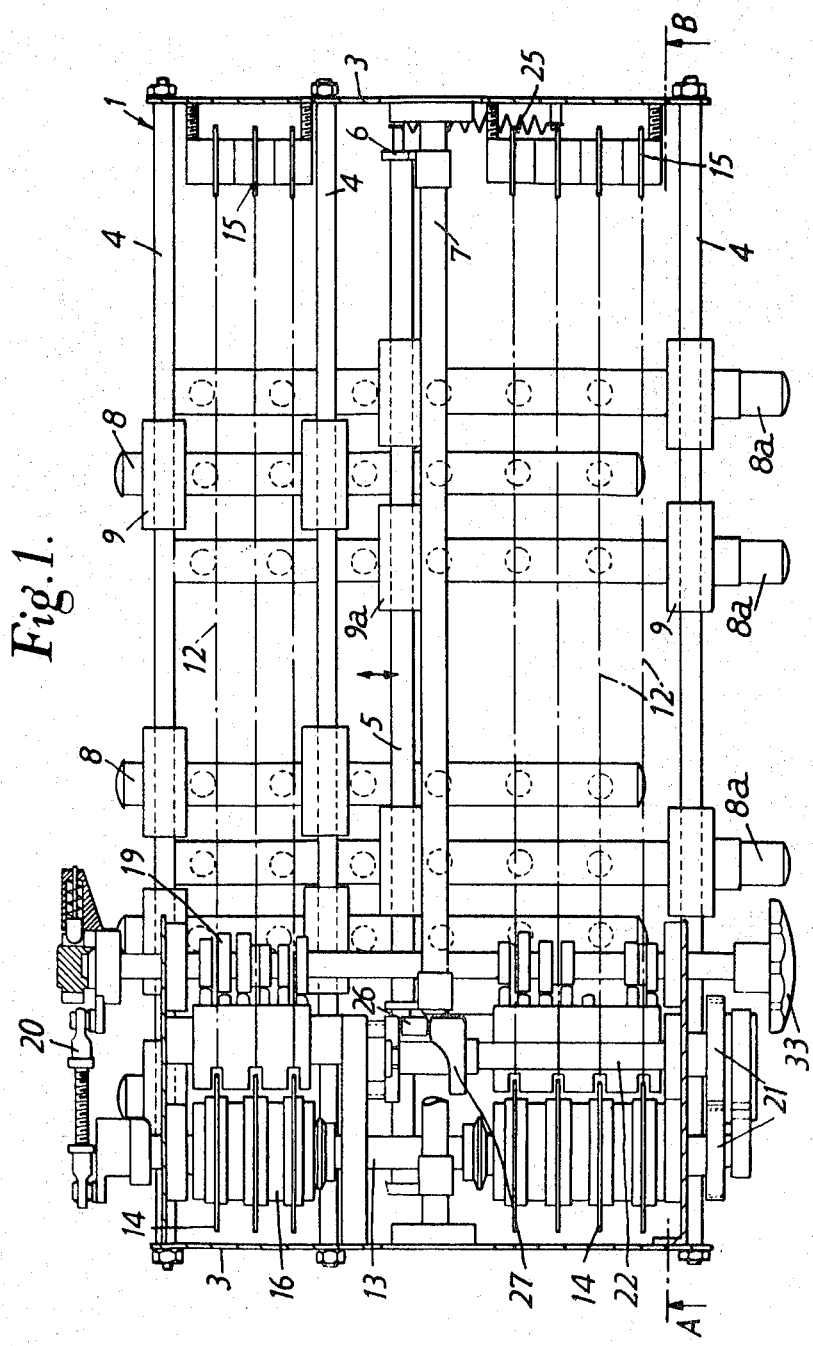

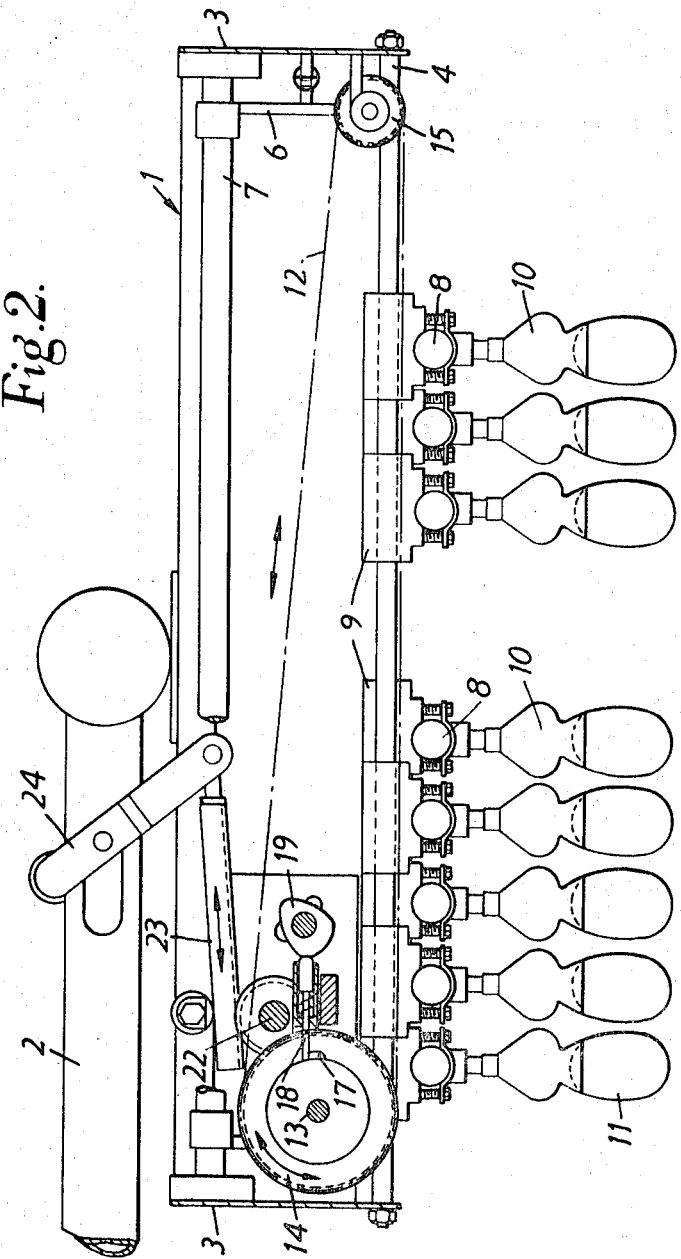

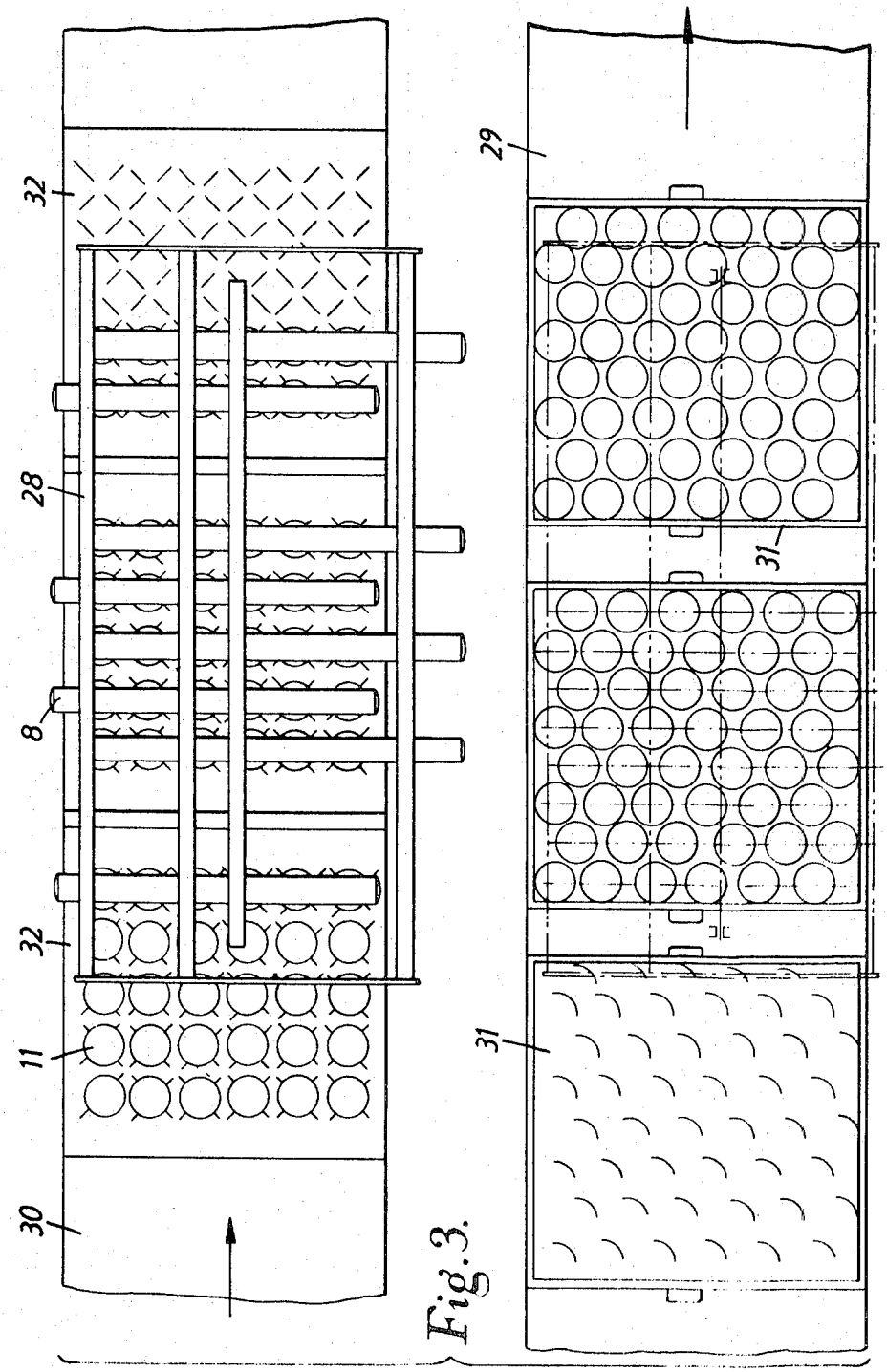

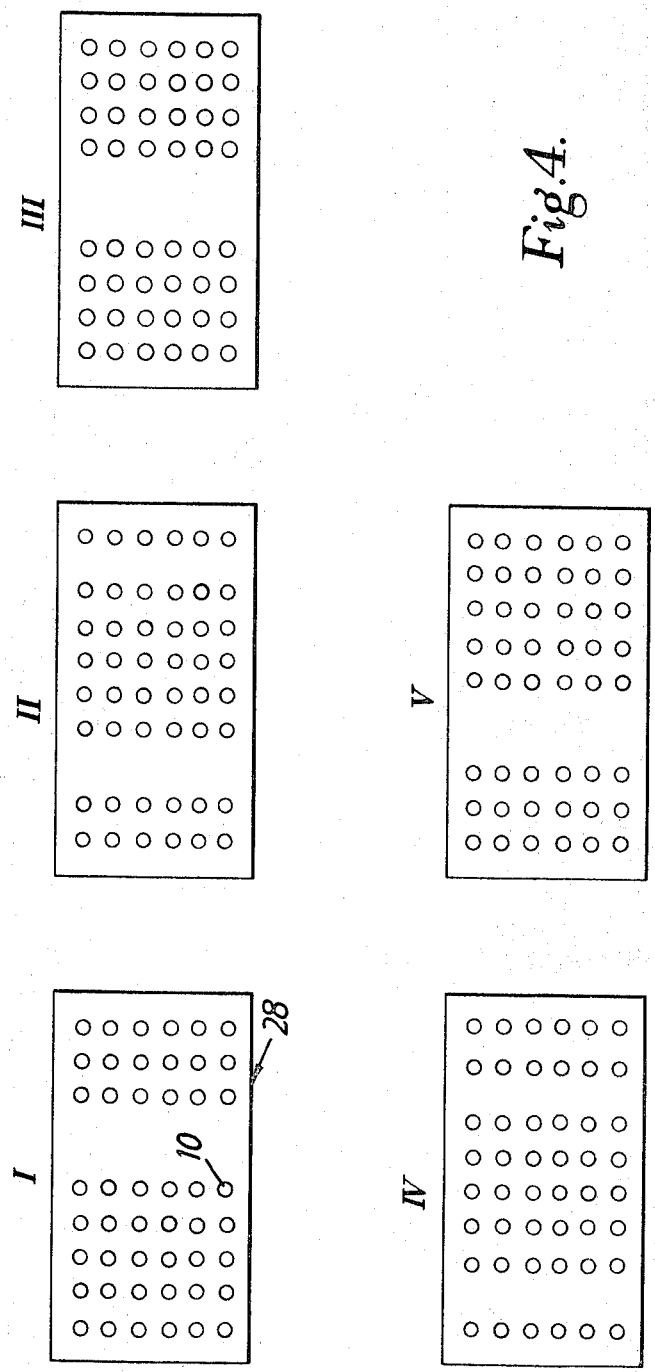

SUCTION LIFTER ENABLING THE SIMULTANEOUS LIFTING OF A PLURALITY OF ITEMS

The invention relates to a suction lifter for the simultaneous lifting of articles arranged in rows, particularly eggs. The lifter may transfer the articles from one conveyor to another of a different form, which renders a change necessary in the positions assumed by the articles in relation to one another on the delivering conveyor means.

Devices of the above-mentioned kind are already known in egg-sorting machines where the eggs are lifted from egg trays conveyed on conveyor belts or the like and transferred to roller conveyors. In this case, the spacing between the rows formed by the eggs in the egg trays can be adapted to the conditions on the roller conveyor in that the lifting frame of the suction lifter, which is mounted for pivoting in a vertical plane across the roller conveyor, has a plurality of tubes which extend in the pivotal direction thereof, are connected to vacuum pipelines, and adapted for parallel displacement and which each carry, at the underside, as many suction cups as there are eggs in a row on the egg trays. Fundamentally, however, this construction can only be used when the same egg trays are always used while it is impossible to empty egg trays having a higher capacity with the same machine. This applies even to those egg trays which have the same number of eggs at least in one direction because the excess rows would nevertheless remain neglected on the trays in each working cycle of the suction lifter. These remaining eggs would then have to be removed subsequently by hand although this is scarcely practicable because of the great expenditure of time necessary.

Similar difficulties also arose in the building of machines for filling incubation trays because there the dimensions of the suction lifter always depended on the particular capacity of the incubation trays. Consequently, the eggs had to be supplied exclusively in egg trays, the contents of which coincided with the number of suction cups provided on the suction lifter. It has therefore hitherto been impossible to transfer eggs packed in smaller trays by mechanical means and this has had a very disadvantageous effect on the general efforts towards mechanization in the egg trade.

In view of the disadvantages which have arisen, it is the object of the invention to provide a suction lifter of the kind in question with which it is possible to pick up articles arranged in rows on a conveyor means, such as eggs in particular, even if the individual rows have different spacing recurring in a specific rhythm. The latter applies in particular to the cases just referred to where the egg trays filled with eggs are supplied in regular sequence one behind the other on conveyor belts, chain conveyors or the like, to the suction lifter which always has to aline its tube equipped with suction cups automatically to lie over a row of eggs which are in different trays. During the transfer, the suction cups should be repositioned, by displacement movements of their tubes, to correspond with the arrangement of the receiving conveyor supports, which in turn might render an arrangement in a honeycomb or in a chessboard pattern necessary.

Accordingly, the invention provides a suction lifter enabling the simultaneous lifting of a plurality of items, such as eggs arranged in rows, the lifter comprising a frame, a plurality of tubes arranged parallel to one another in the frame, connection means for said tubes to a suction line, and a plurality of suction heads spaced along each tube, wherein the tubes are mutually displaceable perpendicular to their length relative to one of their number which is fixed on the frame. The tubes may be reciprocated by shift members controlled by a predetermined programme in the course of pivotal movements executed rhythmically thereby, so that their spacing is adapted alternately to the distribution of articles on a delivering conveyor means and their position on a conveyor support receiving them after transfer. From the design point of view, it is a particular advantage if cable or link chains extend above the tubes carrying the suction heads, being guided at right angles thereto, their number coinciding with that of the movably mounted tubes, each of them being secured to one of these tubes and passing over drive pins which are set in reversing rotation by means of friction clutches from a common shaft until stops provided thereon come against a pin intervening in their circulatory path, which pin is in turn actuated by a camshaft which is constructed so as to accord with the desired program. It may be advisable for every other tube equipped with suction cups to be mounted for displacement in longitudinal direction and for a longitudinal motion to be imparted to these tubes before each of the two pivotal positions of the lifting frame is reached, as a result of which their suction cups either come into alinement with the suction cups of the other tubes which are not displaceable longitudinally, or in staggered relation thereto. This can be achieved simply if the tubes which are displaceable longitudinally are connected to a guide rod which is suspended from the frame on swinging arms and to which a camplate imparts pendulum movements adapted to the working cycles of the lifter. Finally, in order to achieve as simple a mechanical construction as possible it is recommended that the drive for all the movements to be executed by the tubes should derive from the swivel mechanism of the lifting frame by means of a rack, so that no further drive means is required.

The invention, its mode of operation and its construction, is described below with reference to an exemplary embodiment shown in the drawings. In detail:

FIG. 1 shows a plan view of a suction lifter for eggs illustrated partially in section;

FIG. 2 is a longitudinal section on the line A-B in FIG. 1;

FIG. 3 is a diagrammatic plan view of a complete installation for the transfer of eggs; and FIG. 4 shows the sequence of operation of the suction lifter in FIGS. 1 to 3.

The suction lifter for eggs shown in FIGS. 1 and 2 has a lifting frame 1 which is secured to a swivel arm 2. Extending between side plates 3 of this lifting frame 1 are three guide rods 4 which are screwed to the side plates 3 as well as a further guide rod 5 which is not, however, rigidly connected to the lifting frame 1 but suspended from a longitudinal strut 7 thereof by swinging arms 6. The guide rods 4 and 5 support tubes 8, which extend in the direction of swiveling of the lifting frame 1 and are connected to flexible vacuum pipelines, by means of slide members 9. Six vertical suction cups 10 are secured to the underside of each of the tubes 8 and serve to pick up the eggs to be transferred by the suction lifter.

The tube 8 which is visible on the outside left in FIG. 2 is rigidly connected to the lifting frame 1 while all the other tubes 8 can be displaced along the guide rods 4 and 5 by means of their slide members 9. The purpose of this is to enable them to be brought into different positions in order that their mutual spacing may be varied selectively. Thus, the position of the suction cups 10 can always be adapted to the position of eggs 11 on a delivery conveyor means and then altered to that which is required when they are transferred by means of the suction lifter to a different conveying support. For this purpose, the tubes 8 must be shifted preferably in accordance with a specific program, in the course of the swiveling movements executed rhythmically by the lifting frame 1. This shifting is effected by means of shift members which in the present case consist of chains 12 guided at right angles to the tubes 8. The number of these chains 12 is the same as the number of movable tubes 8 and each of the movable tubes 8 is connected to one chain 12 associated therewith. All the chains 12 extend between drive wheels 14 mounted at the left-hand side on a common shaft 13 and idler wheels 15 which are in the vicinity of the right-hand side plate 3 of the lifting frame 1.

The drive wheels 14 of the chains 12 are each connected through friction clutches 16 to the common shaft 13 and in addition carry stops 17 on their side whereby they can be stopped with the shaft 13 still rotating. This occurs when the stops 17 reach pins 18 which project into their circulatory path and which are actuated by cams 19 designed in accordance with the particular conditions. The cams 19 are mounted on a shaft which extends in the same direction as the shaft 13 receiving the drive wheels 14 and is driven thereby through a ratchet drive 20. The shaft 13 is set in reversing rotation through two gearwheels 21 from a shaft 22, for which purpose a rack 23 actuated from the swivel arm 2 by means of a lever 24 acts on the shaft 22.

Apart from the displaceability of the tubes 8 transverse to their length, every other one 8a of them is additionally mounted in the lifting frame 1 for displacement in its own longitudinal direction by its front sliding member 9a engaging not round the rigid guide rod 4 but round the movably suspended guide rod 5. This guide rod 5, which is movably held on the swinging arms 6, is urged by a helical spring 25 with a roller 26 mounted thereon against a camplate 27 on the shaft 22, as a result of which it executes pendulum movements adapted to the working cycle of the suction lifter in accordance with the revolutions of the shaft 22. Thus the guide rod 5 displaces the tubes 8a connected thereto in the longitudinal direction in relation to the other tubes 8 by an amount which corresponds to half the spacing between the suction cups 10. As a result, the suction cups 10 of the longitudinally displaceable tubes 8a come alternately either into alinement with the suction cups 10 on the other tubes 8 which are not displaceable longitudinally or they are staggered in relation thereto.

The mode of operation of the suction lifter illustrated in FIGS. 1 and 2 can be seen from FIGS. 3 and 4. FIG. 3 illustrates diagrammatically a complete plant equipped with this suction lifter for transferring eggs. Apart from the suction lifter, indicated 28, already described, it comprises two conveyor belts 29 and 30 extending side by side, and a series of incubating trays 31 in which the eggs 11 originally in egg trays 32 brought up on the conveyor belt 30 are to be repacked. As FIG. 3 shows, each of the egg trays 32 has five rows, each of six eggs, across the conveyor belt 30 so that there are 30 eggs in each of the egg trays 32. The incubation trays 31 deposited on the conveyor belt 29 on the other hand have a capacity of 48 eggs which are staggered in close-packed formation in order that they may support each other mutually in order to ensure firm support. The eggs 11 have to be brought into this arrangement by the suction lifter 28, so it is necessary for the suction lifter 28 to remove the necessary 48 eggs simultaneously from a plurality of egg trays 32, and to hold them while changing their position so that the gaps between the individual egg trays 32 are removed and the rows staggered. For this purpose, the constructional features shown in FIGS. 1 and 2 are necessary. These enable the positions of the tubes 8 equipped with the suction cups 10 always to be adapted to the conditions which vary after each swiveling motion of the lifter. The various positions of the suction cups 10 repeated cyclically are clear from FIG. 4.

In the position I, the suction lifter 28 lifts five rows out of the first egg tray and a further three rows of eggs out of the second egg tray following it. Thus two rows of eggs still remain in the second egg tray which are picked up by the suction lifter 28 during the working stroke in position II. In addition, it takes all five rows out of a further, third egg tray and the last row out of a fourth egg tray. The remaining four rows are then picked up in position III together with four rows from a fifth egg tray. The remaining row from the fifth egg tray is removed in position IV together with the whole contents of the sixth egg tray and two rows out of a seventh egg tray. For position V, three rows now remain in the seventh egg tray and are brought up to the eight rows necessary by the complete contents of the eighth egg tray so that the working cycle beginning with position I can now be repeated.

All the variations in spacing between the tubes 8 carrying the suction cups 10 as just described are controlled by the cam 19 shown in FIGS. 1 and 2 and through the pins 18 actuated thereby. In order that the camshaft may always be adjusted as required by the sequence of egg trays 32 supplied thereto when suction lifter 28 is started up, a knob 33 is provided thereon whereby the appropriate operating position of the camshaft can be preselected.

In a modification of the design described, hydraulic or electrical controls may be used for the actuation of the adjustable tubes 8, but altogether would involve greater structural expense. A mechanical drive is therefore fundamentally regarded as the optimum solution.

We claim:

1. A suction lifter for lifting a plurality of items comprising a frame, at least three movable tubes and means for movably mounting the same on said frame so that said tubes are arranged parallel to each other, a plurality of suction heads spaced along each of said tubes, drive means for moving each of said tubes independently of each of said other tubes and relative to said frame and at right angles to their length, control means for controlling the relative positions of said tubes variably in accordance with a predetermined cycle and means for connecting said tubes to a suction line.

2. A suction lifter for lifting a plurality of items comprising a frame, a tube fixed in said frame, at least three movable tubes, means mounting said movable tubes in said frame parallel to said fixed tube, a plurality of suction heads spaced along each said tube, drive means for moving each of said movable tubes independently of each other towards and away from said fixed tube while remaining parallel to said fixed tube, control means for controlling the relative positions of said fixed and movable tubes variably in accordance with a predetermined cycle, and connection means for connecting all said tubes to a suction line.

3. A suction lifter as defined in claim 2, wherein said drive means comprises a common shaft and a friction clutch for each movable tube driven by said common shaft and wherein said control means comprises a stop pin rotating with each said friction clutch, a control pin movable into and out of the path of each said stop pin and a rotary cam for moving each said control pin.

4. A suction lifter as defined in claim 3, wherein said drive means further comprises a chain or cable drive for transmitting drive from each said friction clutch to each said movable tube.

5. A suction lifter as defined in claim 3, further comprising means for displacing alternate tubes in their longitudinal direction relative to the remaining tubes.

6. A suction lifter as defined in claim 5, further comprising a guide rod, swing levers by means of which said guide rod is connected to said lifting frame, means for connecting said displaceable alternate tubes to said guide rod and cam means for controlling displacing movement of said guide rod.

7. A suction lifter as defined in claim 6, further comprising a swivel arm for swinging the lifting frame in a horizontal plane.

8. A suction lifter as defined in claim 7, further comprising a rack actuated by said swivel arm for driving said common shaft.

UNITED STATES PATENT OFFICE
CERTIFICATE OF CORRECTION

Patent No. 3,542,412          Dated November 24th, 1970

Inventor(s) Heinrich Koch and Kurt Hermsmeyer

It is certified that error appears in the above-identified patent and that said Letters Patent are hereby corrected as shown below:

In the heading of the patent, line 7, change "Kull" to --Kuh

SIGNED AND
SEALED
MAR 9 1971

(SEAL)
Attest:

Edward M. Fletcher, Jr.
Attesting Officer

WILLIAM E. SCHUYLER, JR.
Commissioner of Patents